UNITED STATES PATENT OFFICE.

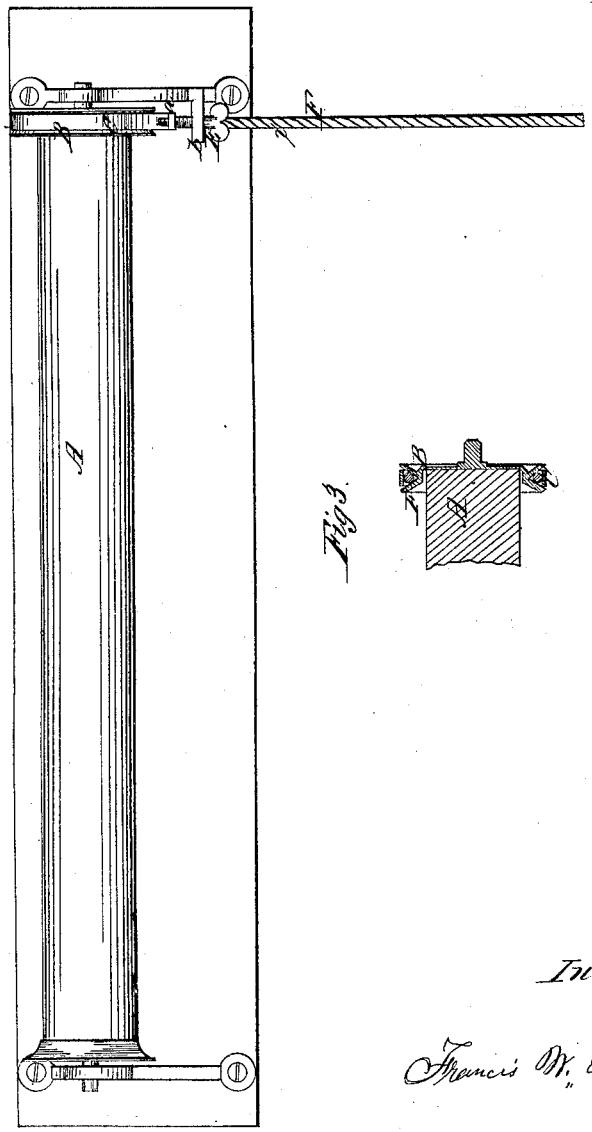

F. W. STAFFORD, OF NEW YORK, N. Y.

SHADE-FIXTURE.

Specification of Letters Patent No. 31,336, dated February 5, 1861.

*To all whom it may concern:*

Be it known that I, F. W. STAFFORD, of the city, county, and State of New York, have invented a new and useful Improvement in Shade-Fixtures; and I do hereby declare that the following is a full, clear, and exact description of the same, reference being had to the annexed drawings, making a part of this specification, in which—

Figure 1, is a front view of a shade-roller with my invention applied to it. Fig. 2, a section of the same taken in the line $x, x$, Fig. 1, Fig. 3, a section of the same taken in the line $y, y$, Fig. 2.

Similar letters of reference indicate corresponding parts in the several figures.

The object of this invention is to dispense with the lower tightening pulleys hitherto used to keep the roller cords taut, which pulleys cause considerable friction as well as a stretching of the cords when new and therefore involve the necessity of a frequent adjustment of the tightening pulley.

The invention consists in the employment or use of an adjustable strap which encompasses the pulley on the shade roller and is so arranged as to confine the cord on said pulley and around its periphery so that the pulley and roller may be turned by operating the cord which is allowed to hang perfectly loose from the roller pulley.

To enable those skilled in the art to fully understand and construct my invention I will proceed to describe it.

A, represents a shade roller which may be hung at the top of the window casing in the usual or in any proper way, and B, is a pulley which is placed on or secured to one end of the roller A. This pulley has a grooved periphery, the groove being of V-shape in its transverse section as shown clearly in Fig. 3.

C, is a metal strap one end $a^x$, of which is attached permanently to the bracket D, which supports one end of the roller. The other end of this strap terminates in a nut $a$, through which a thumb-screw E, passes said screw also passing through a projection $b$, at the lower part of the bracket. The strap C, encompasses the pulley B, as shown clearly in Fig. 2, and retains the cord F, thereon. The cord F, may be of the usual kind and the strap C, keeps the cord F, confined in the groove nearly around the whole periphery of the pulley and the cord is pressed more or less tightly in the groove by adjusting screw E. By this arrangement it will be seen that the cord F, may hang perfectly loose from the pulley B, and the pulley and roller turned by pulling the cord, as the strap C, keeps the cord on the pulley and presses it into the V-shaped groove sufficiently to produce the necessary bearing or friction to cause the roller to turn as the cord is pulled. The lower adjustable pulley therefore which has heretofore been generally used for the lower part of the cord to pass around and for tightening said cord is hereby dispensed with and considerable expense avoided as well as less trouble in keeping the cord in proper working order, for by my invention the cord is not liable to be stretched by under tension owing to the greater bearing surface the cord has around its pulley B, and the avoiding of the stretching or tightening of the cord as heretofore.

Having thus described my invention what I claim as new and desire to secure by Letters Patent, is—

The employment or use of the adjustable strap C, in connection with the grooved pulley B, and cord F, the strap being applied to the pulley to act upon the cord substantially as and for the purpose herein set forth.

FRANCIS W. STAFFORD.

Witnesses:
JAMES LAIRD,
LEWIS A. TUCKER.